Dec. 24, 1963   H. FRITSCH   3,115,596
ELECTRICAL CONDENSER
Filed Feb. 24, 1959   2 Sheets-Sheet 1

INVENTOR.
H. FRITSCH
BY

Dec. 24, 1963    H. FRITSCH    3,115,596
ELECTRICAL CONDENSER
Filed Feb. 24, 1959    2 Sheets-Sheet 2
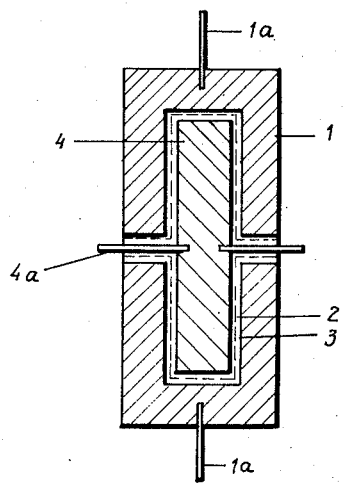
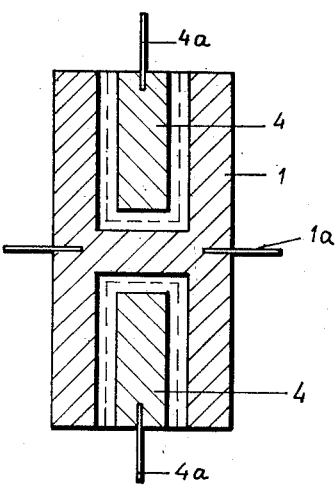
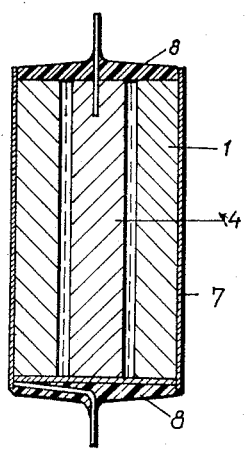
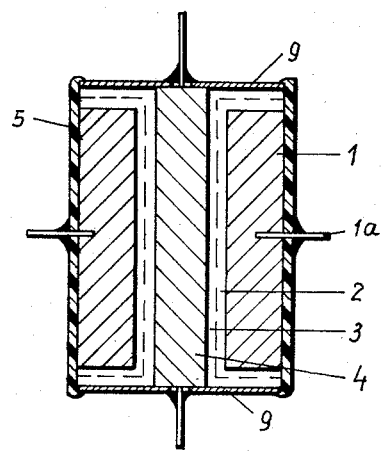
INVENTOR.
H. FRITSCH
BY

United States Patent Office 3,115,596
Patented Dec. 24, 1963

3,115,596
ELECTRICAL CONDENSER
Helmut Fritsch, Nurnberg, Germany, assignor to International Standard Electric Corporation, New York, N.Y., a corporation of Delaware
Filed Feb. 24, 1959, Ser. No. 795,143
Claims priority, application Germany Mar. 1, 1958
1 Claim. (Cl. 317—230)

The present invention relates to an electrical condenser in which at least one electrode consists of a porous sintered body which is coated with a dielectric conversion layer and with a semiconductor layer arranged on this conversion layer.

Electrical condensers have already become known in which at least one electrode consists of a porous metallic sintered body. This sintered body is coated with a dielectric conversion layer of the base metal, forming the dielectric of the condenser. Such layers can be produced e.g. by the oxidation of the base metal.

Recently such types of condensers have become known in which the dielectric layer is covered with a semiconductor. In many cases there are used to this end semiconductor substances consisting of a chemical compound, containing the nonmetallic components of the dielectric layer and are easily released upon being heated. In the case of such condensers there are chiefly used as base metals valve or electrode metals, such as aluminium and tantalum, which can be coated in a simple manner with a dielectric oxide layer. However, it is not absolutely necessary to produce the dielectric layer by way of oxidation. Thus, for example, as a base metal there may be used titanium, which is coated with a dielectric titanium nitride layer. As a semiconductor there may be used e.g. germanium, but such types of semiconductors are to be preferred which, upon heating, split off the nonmetallic components of the dielectric layer. In this way even if the dielectric layer is damaged in the case of a breakdown or puncture at the point of breakdown, it is restored from the base metal and from the nonmetallic components which are set free from the semiconductor substance, thus effecting a self-healing of the condenser. If the dielectric layer consists of a layer of oxide, then semiconductors are used which easily release oxygen when being heated. In particular, manganese dioxide has proved to be suitable to this end. However, it is to be pointed out that also other substances with corresponding properties are suitable for such use.

In the case of such types of condensers it has further proved to be of advantage to apply to the semiconductor layer a well-conducting intermediate layer, e.g. of graphite.

The sintered body is obtained in the conventional manner by pressing and sintering the respective metal powder, in the course of which simultaneously a respective electrode lead-in may be mounted within the sintered body.

Condensers of this type have been manufactured up to now in such a way that the sintered body was subjected to a chemical conversion or change, for producing the dielectric layer thereon which, thereafter, was covered with the semiconductor layer and, if necessary, with a further layer, e.g. of graphite. Finally, and upon the outer surface of the thus obtained body the counter electrode was applied by way of spraying or evaporation. In this way there are obtained electrical condensers having a very high capacity per volume unit and, due to the nonemployment of liquids, do not explode when being overloaded, and which prevent damage to structural elements that are arranged near them, which can easily happen otherwise on account of the leakage of an electrolyte.

One disadvantage of the conventional types of condensers resides in the fact that the counter electrode, which is applied to the outside, can be easily damaged because it only consists of a very thin metal layer which, in addition thereto, is applied to a base of graphite. Furthermore it is also difficult to attach self-supporting connections to the counter electrode, without damaging the counter electrode layer, and it is difficult to anchor such connections in the condenser body with a sufficient mechanical stability. For this reason it is necessary in many applications to additionally insert such a condenser into a casing. This, however, partly eliminates the considerable advantages of small dimensions and the low weight at a high capacity.

An object of the present invention is to avoid the aforementioned difficulties.

FIGS. 3 to 8 are respective modifications of the condenser structure shown in FIG. 1.

According to the invention an electrical condenser consisting of at least one porous metallic sintered body, which is coated with a dielectric conversion layer of the metal, on which a semiconductor layer is arranged, preferably of a chemical compound, containing the nonmetallic components of the conversion layer and easily splits them off upon being heated, is fabricated in such a way that the sintered body embraces the counter electrode and mechanically supports it.

In this way the condenser is provided with a simple shape, which can be easily provided with an insulated coating e.g. by way of immersing or spraying, or in any other way. The electrode leadins, due to the fact of their being firmly anchored in the condenser body, may be safely used for holding the entire condenser in place.

The invention, as well as advantageous further embodiments thereof, will now be described in particular with reference to the accompanying drawings.

Figure 1:
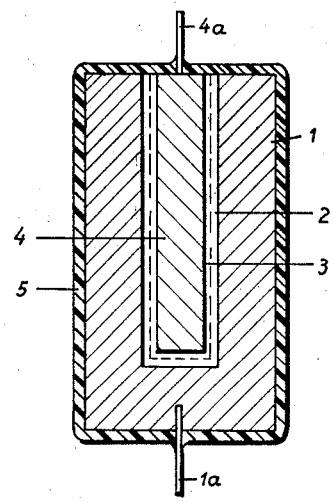
FIG. 1 is a longitudinal sectional view of a condenser according to the invention.

In FIG. 1 there is shown a metalic sintered body 1 which is obtained e.g. by pressing and sintering tantalum powder. This sintered body is provided with a central cavity or recess serving to receive the counter electrode. First of all the sintered body is coated in the conventional manner with a dielectric layer, e.g. of tantalum oxide, which is thereupon coated with a further layer of a suitable semiconductor, such as manganese dioxide. This, by way of example may be carried out in such a way that the sintered body is impregnated with the solution of a manganese salt, e.g. manganese nitrate, and is thereupon heated to such an extent that the manganese nitrate will be decomposed and a layer of manganese dioxide will remain. In some cases it may be required to repeat this treatment several times in succession, or even by applying layers of various semiconductors upon each other, as has already been proposed.

Appropriately, the recess in the sintered body is coated with a somewhat stronger semiconductor layer, which is denoted in FIG. 1 by the reference numeral 2. The semiconductor layer in the recess will now be coated with a well-conducting layer 3, e.g. of graphite. Thereupon, a metallic counter electrode 4 will be inserted into the recess, said counter electrode 4 being shaped and embodied in such a way that it will be firmly retained in the recess, without, however, damaging the layers 2 and 3 during the insertion. This may be accomplished e.g. in such a way that a suitable metal body is pressed into the cavity, which cavity is appropriately lined with a not too thin graphite layer. The counter electrode is provided with a suitable electrode terminal 4a, while the other terminal 1a is formed by either a pin or wire which is pressed into the sintered body and is sintered therein and/or welded to the sintered body. The finished condenser is appropriately coated with an insulating layer 5 applied either by way of spraying, immersing, or in any other way.

It is of a particular advantage to embody the counter electrode in such a way that it will engage resiliently the inside of the recess or cavity. This is accomplished e.g. in that as a counter electrode there is used a longitudinally slotted, resilient metal tube.

Figure 2A:
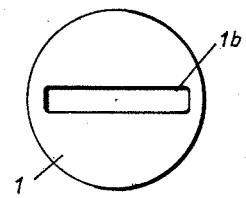
FIGS. 2a and 2b are respective cross sectional views of modified shapes for the bores in one of the electrodes in FIG. 1.
Figure 2B:
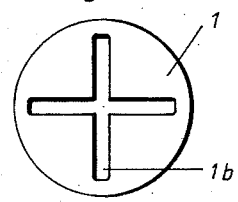

The shape and size of the recess may be chosen at will, but care will have to be taken that the surface of the counter electrode is adapted to the size of the sintered body. Thus, for instance, the recess within the sintered body may have the same shape as the sintered body itself, in other words, that in the case of a cylindrical sintered body there is provided a cylindrical recess. However, it may also be appropriate to give the recess any other suitable shape to which the counter electrode will have to be adapted. In FIGS. 2a and 2b of the drawings there are shown two cylindrical types of sintered bodies 1 in a top-view, of which the sintered body according to the showing of FIG. 2a has a recess 1b with a rectangular cross-section, whereas the sintered body according to the showing of FIG. 2b has a recess with a crosslike cross-section. In these cases there are used as counter electrodes resilient metal tapes which are pushed into these slots. The shape and size of the recess depends on the surface which is required for the collector electrode, as well as upon the mechanical requirements. The shape and size is always chosen so that the counter electrode will be firmly retained within the sintered body.

Figure 3:
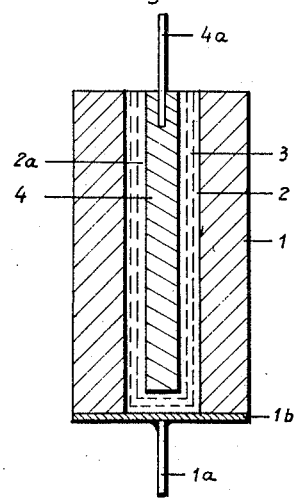

Instead of a metal counter electrode, however, there may also be used a correspondingly shaped sintered body as the second electrode, which is aprporiately made from the same metal as the first sintered body and is also provided with the same coatings. In this way there will be obtained a bipolar condenser. In FIG. 3 there is shown a condenser of this type. The sintered body 1 is embodied in this case as a cylinder and is supposed to carry on the inside the semiconductor layer 2 and thereupon the graphite layer 3. This again is followed by a semiconductor layer 2a in which the sintered body 4, serving as the counter electrode, is embedded. The sintered electrode terminal 4a serves as a lead in to the inside sintered body. The electrode terminal for the outside sintered body is designed in this case in a different manner. The cylindrical sintered body is terminated by a metal sheet 1b consisting of the same material as the sintered body. This piece of sheet metal may be welded e.g. to the sintered body or may have been previously connected therewith during the sintering process. To this piece of sheet metal the lead in 1a is mounted e.g. by way of welding.

Figure 4:
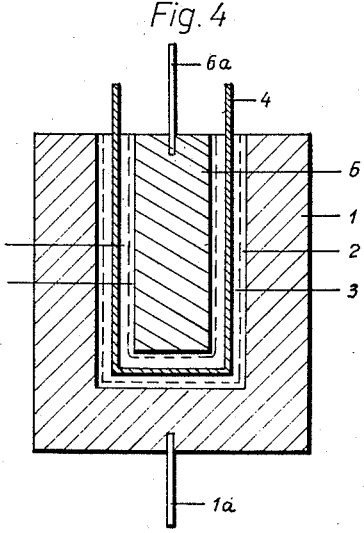

A further modification of the invention is shown in FIG. 4 of the drawings. The sintered body 1 with the lead in 1a attached thereto is coated in the recess with the semiconductor layer 2 and with the graphite layer 3. In this cavity there is arranged the metallic counter electrode 4 which, e.g., consists of a metallic hollow cylinder. Within this cylinder there is disposed the carbon layer 3a as well as the semiconductor layer 2a. Finally, the cavity is filled out by the sintered body 6 with the terminal 6a. In this way there will be obtained two oppositely connected condensers, whose common electrode is formed by the metal cylinder 4.

A further type of embodiment of the inveniton is shown in FIG. 5. The two sintered bodies 1 are covered in their recesses with the layers 2 and 3 and are held together by a counter electrode 4 projecting into both of these sinter bodies 1. The connection of the counter electrode is appropriately established by means of wires projecting outwardly between the two sintered bodies 1. The counter electrode 4, however, may also consist again of a sintered body whose connection or terminal is e.g. formed by a sheet metal disc sintered into the sintered body and consisting of the metal of the sintered electrode. In this last mentioned arrangement the sintered body 4 is appropirately covered likewise with a semiconducting layer. In some cases it may be of advantage to provide the lead in 4a partially with an insulating coating so that a short circuit will be prevented from occurring at this point.

Furthermore it is also possible to design a sintered body in a way to be provided with several recesses or cavities. A corresponding example is shown in FIG. 6 of the drawings. The sintered body 1 is provided with two recesses in which the corresponding counter electrodes 4 are supported. These counter electrodes, as is the case in the previously mentioned examples, may consist of metal or may be likewise embodied as a sintered body with a dielectric layer.

In describing the embodiment of FIG. 1 it had already been mentioned to be appropriate to cover the condenser with a layer of insulating material. According to a further embodiment of the invention it is further proposed to provide as an insulating coating a glaze on a silicate base on the sintered body. Appropriately, only a part of a sintered body is provided with such a glaze, because this coating has to be applied subsequently to the manufacture of the sintered body or prior to the manufacture of the semiconductive coating. Thus the cylindrical sintered body of tantalum is coated e.g. with a deposit of felspar, quartz, etc., and is heated to such an extent that the coating will melt to form a glaze. Appropriately, only the outer surface of the cylinder will be coated with this glaze to permit, during the forming of the dielectric oxide layer and the semiconductor layer, liquids to penetrate into the sintered body.

A further possibility consists in lining a suitable metal mold with a sintered body in the manner as actually known per se. A condenser of this type is shown in FIG. 7 of the drawings. The body of the condenser consists of a suitable metal cylinder 7, e.g. of tantalum, into which a layer 1 of tantalum powder is pressed and is united therewith by means of sintering. The electrode 4 consists also of metal or likewise of a sintered body, and between the two electrodes there are disposed the already mentioned intermediate layers of a semiconductor substance and graphite. Appropriately the cylinder 7 is somewhat longer than the electrodes assigned thereto, so that the condenser, after its completion, can be sealed in a simple manner by way of filling-in a suitable insulating compound 8 at the ends thereof. It is advisable to use for that purpose either a cold-setting or thermo-setting resin, not producing liquids or gases while hardening.

In FIG. 8 there is shown a further modification of the invention. In the cylindrical sintered body 1 there is coaxially arranged the counter electrode 4. This electrode is provided at both ends with pin-like extensions. Over these extensions there are placed the apertured plates 9 which are attached thereto in any suitable way, e.g. by way of soldering, welding or screwing. The plates 9 abut on the flat faces of the sintered body 1, so that in this way there will be obtained a particularly stable embodiment. Between the plates and the said flat faces of the sintered body there are arranged the same layers 2 and 3, as between the sintered body and the counter electrode 4. Appropriately, the outside jacket of the sintered body is exteriorly coated with a layer of insulating material 5.

Besides the shown and described examples of embodiment it is also possible to further modify the idea of the invention. Likewise also the individual features as described with respect to the exemplified embodiments may be combined in any suitable way.

For practicing the invention there are preferably used, suitable sintered bodies of tantalum, which are coated with a dielectric oxide layer on which there are deposited one or more semiconducting layers of manganese dioxide.

Due to the fact that there are employed sintered bodies of a very hard structure, an electrical condenser will result which is vastly insensitive to mechanical damages. For this reason it is possible to use these types of condensers, which may e.g. have the shape of bars or rods, as elements in the construction of other electrical components. Thus, for instance, such a condenser may be used as a winding core for an electric winding condenser. When employing a sintered body of iron, then the finished condenser may also be used as the core of a coil.

While I have described above the principles of my invention in connection with specific apparatus, it is to be clearly understood that this description is made only by way of example and not as a limitation to the scope of my invention as set forth in the objects thereof and in the accompanying claim.

What is claimed is:

A dual capacitor in a single unit composed of one envelope containing a combination of a first anode of sintered tantalum particles, a chamber extending into the body of said first anode, a dielectric film formed on the surfaces of the particles of the said first anode substantially throughout the first anode body, a solid electrolyte impregnated into the interstices of the first anode and in intimate contact with said dielectric film, a first coat of solid electrolyte formed on said first anode so as to extend across said first anode, a second anode of sintered tantalum particles, said second anode being of slightly smaller dimension than said chamber in said first anode and positionable in said chamber, a dielectric film formed on the surfaces of the particles of said second anode, a solid electrolyte impregnated into the interstices of the said second anode, a second coat of solid electrolyte formed on said second anode so as to extend across said second anode, a common cathode of a metallic conductor interposed between said first and second electrolyte coats within said chamber, and separated from and insulated from both the first and second anodes.

References Cited in the file of this patent

UNITED STATES PATENTS

| | | |
|---|---|---|
| 1,906,691 | Lilienfeld | May 2, 1933 |
| 2,005,279 | Van Geel | June 18, 1935 |
| 2,299,667 | Watermann | Oct. 20, 1942 |
| 2,695,443 | Wagner | Nov. 30, 1954 |
| 2,769,944 | Stein et al. | Nov. 6, 1956 |
| 2,800,616 | Becker | July 23, 1957 |
| 2,836,776 | Ishikawa et al. | May 27, 1958 |
| 2,936,514 | Millard | May 17, 1960 |

FOREIGN PATENTS

| | | |
|---|---|---|
| 734,067 | Great Britain | July 20, 1955 |
| 747,051 | Great Britain | Mar. 28, 1956 |
| 772,555 | Great Britain | Apr. 17, 1957 |